E. C. HALE.

Improvement in Milk-Vats.

No. 131,874.          Patented Oct. 1, 1872.

WITNESSES.
Phil. C. Mase.
D. D. Hauer.

INVENTOR.
Elvira C. Hale.
Chipman Hosmer & Co,
Attys.

UNITED STATES PATENT OFFICE.

ELVIRA C. HALE, OF STEAMBURG, NEW YORK.

IMPROVEMENT IN MILK-VATS.

Specification forming part of Letters Patent No. 131,874, dated October 1, 1872.

*To all whom it may concern:*

Be it known that I, ELVIRA C. HALE, of Steamburg, in the county of Cattaraugus and State of New York, have invented a new and valuable Improvement in Milk-Vats; and I do hereby declare that the following is a full, clear, and exact description of the construction and operation of the same, reference being had to the annexed drawing making a part of this specification, and to the letters and figures of reference marked thereon.

Figure 1:
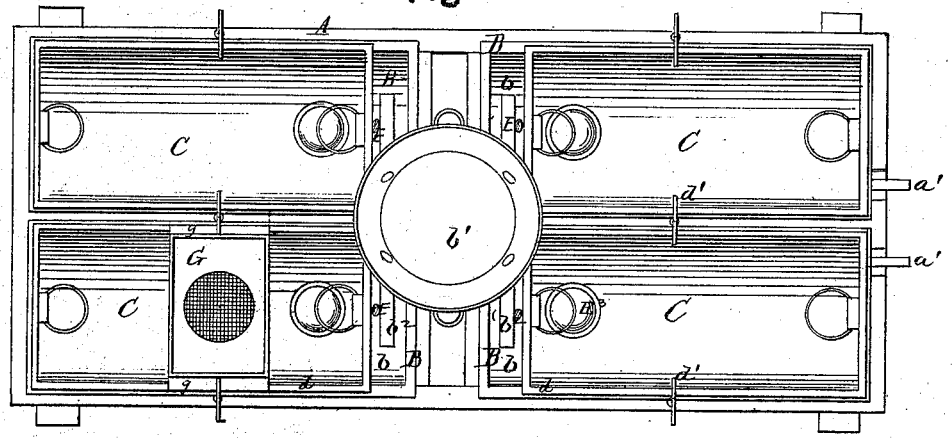
Figure 2:
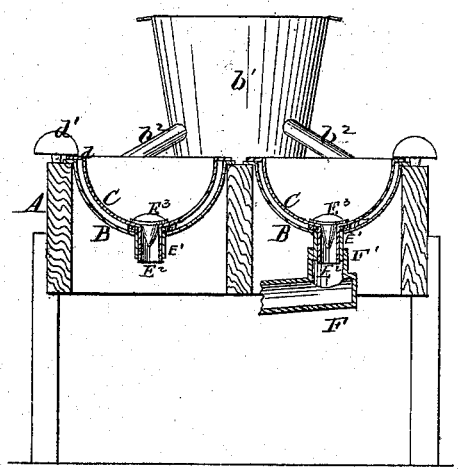
Figure 3:
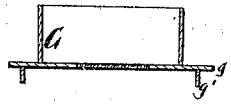

Figure 1 of the drawing is a representation of a plan view of my invention. Fig. 2 is a vertical section of my invention. Figs. 3 and 4 are detail views of my invention.

My invention has relation to that class of milk-vats in which the milk-pans are placed within troughs containing water; and it consists in the construction and novel arrangement of a milk-strainer, together with other elements, constituting a convenient apparatus for dairy use, as hereinafter described.

Referring to the accompanying drawing, A represents a rectangular frame, divided off into sections by means of vertical partitions, so as to hold a number of milk-pans and their respective water-troughs. B represents said water-troughs, of concave form, and furnished with edge-flanges, which rest on the frame A for support. C designates the milk-pans, of similar form to the troughs, within which they are placed, and upon the edges of which they are supported by means of flanges $d$. These pans may be taken out and replaced at will. Between the inner end of each pan and its trough a space, $b$, is left. A tank, $b^1$, rests on the frame A, and has conduit-pipes $b^2$, leading into the troughs through the spaces $b$. These pipes may be furnished with cocks to regulate the flow of water with which the tank supplies the troughs. The troughs may have pipes leading from one to the other, so as to allow the water to run through and to keep the same at an even level throughout. Pipes $a'$ may be also arranged at the ends of the frame and leading from the troughs to conduct the water out of them when it rises too high, or on other occasions. These pipes should be made of lead or other pliable material which will enable them to be bent to different positions, so that the water may be run off whenever it is desired. $d^1$ designates keys for securing the troughs and pans tightly in their places. E represents apertures in the bottoms of the troughs, and designed for the purpose of conducting off the water, and thereby emptying the troughs. These apertures are closed by stoppers. $E^1$ represents tubes passing through the bottoms of the troughs. $E^2$ are smaller tubes, attached to the pans and fitting within the tubes $E^1$. The tubes $E^2$ are used for carrying off the milk from the pans. Packing of India rubber or leather $d^2$, placed around the upper parts of the tubes $E^2$, prevents the water from escaping out of the troughs. $E^3$ designates stoppers for the tubes $E^2$. These stoppers are also furnished with packing $d^3$, to prevent any waste of milk. F indicates a branch pipe having a connecting-section, $F'$. This pipe is used for conducting the milk from the pans to a barrel or other vessel, and may be transferred from one of the tubes $E^2$ to another. G denotes a strainer having projecting end flanges $g$, which rest on the edges of the milk-pans when the strainer is in use, and vertical flanges $g'$, which, at the same time, pass down into the pans and prevent lateral movement of the strainer. The strainer is transferable from one pan to the other.

I am aware that a frame with removable pans is not new; hence I do not claim, broadly, such invention.

What I claim as my invention, and desire to secure by Letters Patent, is—

1. The combination, in a milk-vat, of the frame A with rectangular openings, the semi-cylindrical water-troughs B, the removable milk-pans C, water-tank $b^1$, and strainer G, said troughs, pans, and strainer being provided with side flanges to rest on the edges of the openings in the frame, substantially as specified.

2. The strainer G, constructed to fit the milk-pans C, and provided with the flanges $g$ $g'$, substantially as specified.

In testimony that I claim the above I have hereunto subscribed my name in the presence of two witnesses.

ELVIRA C. HALE.

Witnesses:
ALBERT HALE,
ELBERT PRICE.